Aug. 31, 1948.  H. O. PETRASKE  2,448,120
AUTOMATIC CLEANING DEVICE FOR BATTERY BROODERS
Filed Feb. 11, 1943  6 Sheets-Sheet 1

INVENTOR.
HARRY O. PETRASKE
BY
ATTORNEY

Aug. 31, 1948.  H. O. PETRASKE  2,448,120
AUTOMATIC CLEANING DEVICE FOR BATTERY BROODERS
Filed Feb. 11, 1943  6 Sheets-Sheet 2

INVENTOR.
HARRY O. PETRASKE
BY
ATTORNEY

Aug. 31, 1948.   H. O. PETRASKE   2,448,120
AUTOMATIC CLEANING DEVICE FOR BATTERY BROODERS
Filed Feb. 11, 1943   6 Sheets-Sheet 4

INVENTOR.
HARRY O. PETRASKE
BY
ATTORNEY

Aug. 31, 1948.    H. O. PETRASKE    2,448,120
AUTOMATIC CLEANING DEVICE FOR BATTERY BROODERS
Filed Feb. 11, 1943    6 Sheets-Sheet 5
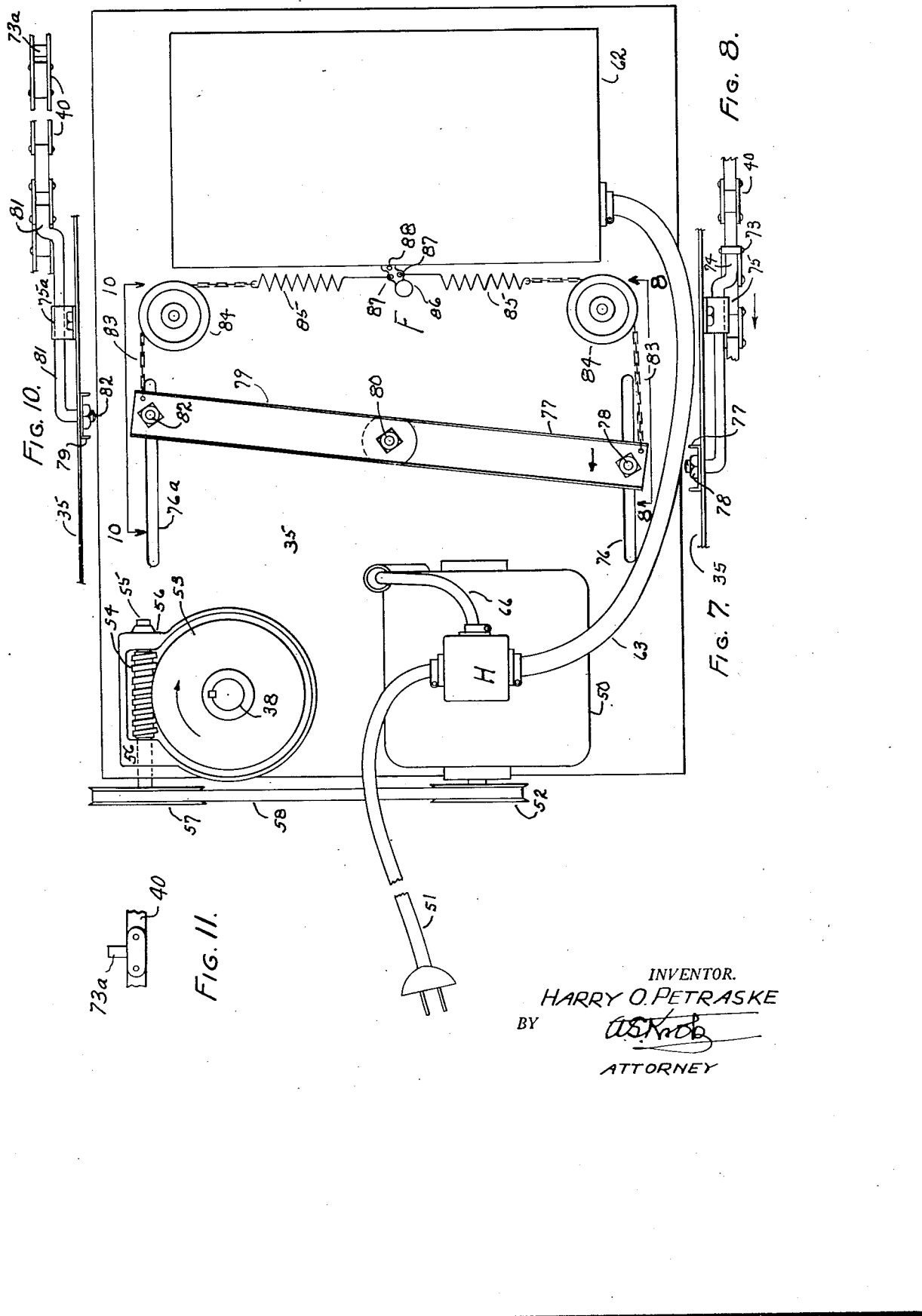

Patented Aug. 31, 1948

2,448,120

UNITED STATES PATENT OFFICE 2,448,120

AUTOMATIC CLEANING DEVICE FOR BATTERY BROODERS

Harry O. Petraske, Fort Atkinson, Wis., assignor to James Manufacturing Company, Fort Atkinson, Wis., a company of Wisconsin Application February 11, 1943, Serial No. 475,511

4 Claims. (Cl. 119—22)

The present invention relates to battery brooders and the like used for laying hens, brooding chicks and for raising broilers wherein wire screen floors are provided for the birds in each compartment which are arranged one above the other and droppings pans are positioned directly below the screen floors for catching the droppings.

In devices of this class, the droppings pans should be cleaned at stated intervals. This is quite a task when done manually by means of a hand scraper and if the cleaning is neglected, the droppings will dry and harden and make the cleaning more difficult.

An object of my invention is to provide means whereby the droppings pans may be cleaned automatically at predetermined intervals and without attention.

In most poultry farms, electric current is available and I therefore provide novel electrical means whereby the droppings pans are preferably cleaned automatically at predetermined intervals by means of a clock controlled electric motor.

Generally stated, an object of my invention is to provide a simple low cost cleaning device for a battery of the character which will operate at maximum efficiency.

A further object of my invention is to provide means whereby the droppings are moved from the droppings pan and delivered into detachable receptacles so the receptacles may be emptied in a convenient manner and at the most convenient time for the attendant.

A further object of my invention is to provide a double bladed scraper for each droppings pan which is caused to move in opposite directions to the adjacent scraper simultaneously across the top of each pan.

A still further object of my invention is to provide means whereby the time between operations of the scrapers may be easily changed.

An important object of my invention is to provide a device of the class which is simple, easily understood, easily and cheaply operated and a device which will not disturb nor attract the attention of the birds while in operation.

To these and other useful ends, my invention consists of parts, combinations of parts, or their equivalents, and mode of operation, as hereinafter set forth and claimed and shown in the accompanying drawings in which:

Fig. 7 is a side view of the mechanism which operates the controlling switches and illustrating the motor driving connection to one of the chain shafts.

Fig. 8 is a fractional view of the device shown in Figure 7, looking up on line 8—8 of this figure.

Fig. 10 is a view similar to Figure 8 taken on line 10—10 of Figure 7.

Fig. 11 is a fragmentary elevational view showing one of the stop members rising from a chain of the mechanism.

Figure 1:
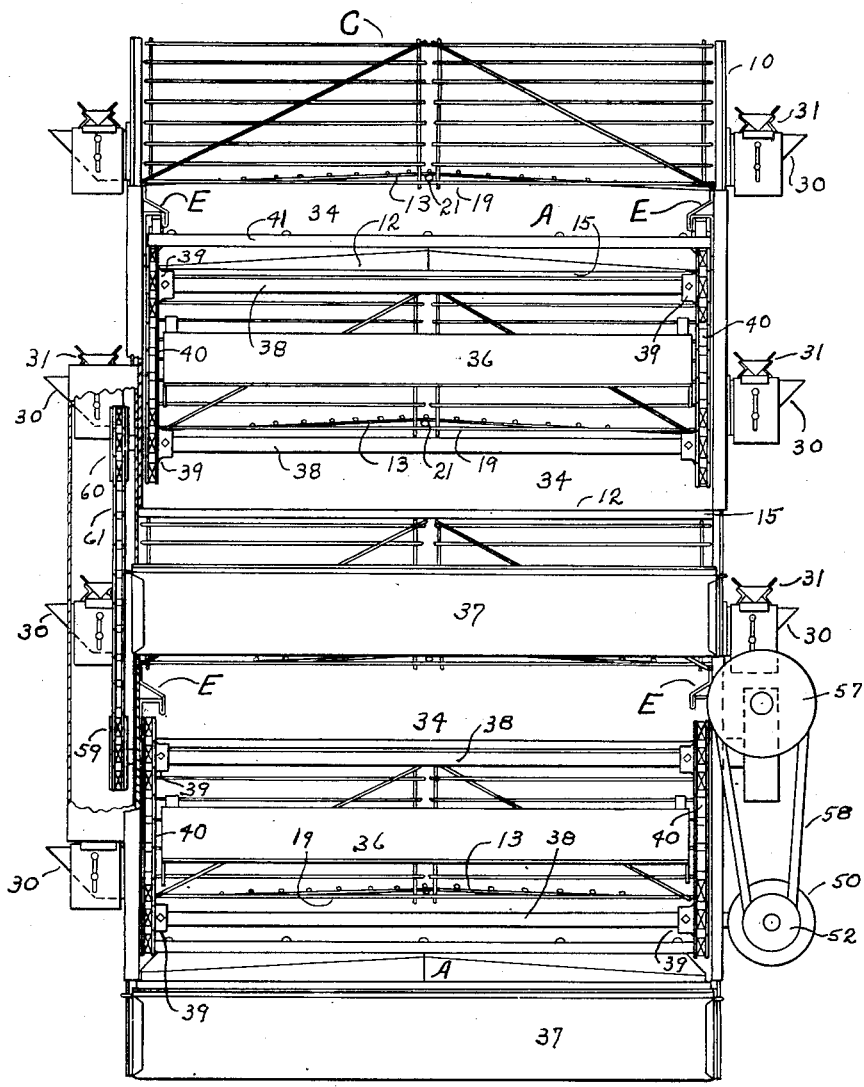
Fig. 1 is an end view of a four tier battery brooder wherein feeding and watering troughs are shown as positioned on the sides of the compartments as is the custom in battery devices of the class.

In the various figures, the droppings pan scrappers are designated in their entireties by reference characters A, and the compartments for the birds are designated in their entireties by reference characters B. The rod assemblies forming the closures for the ends of the compartments are designated in their entireties by reference characters C and the rod assemblies forming closures for the sides of the compartments are designated in their entireties by reference character D. The longitudinal bars in their entireties are designated by reference character E.

Figure 2:
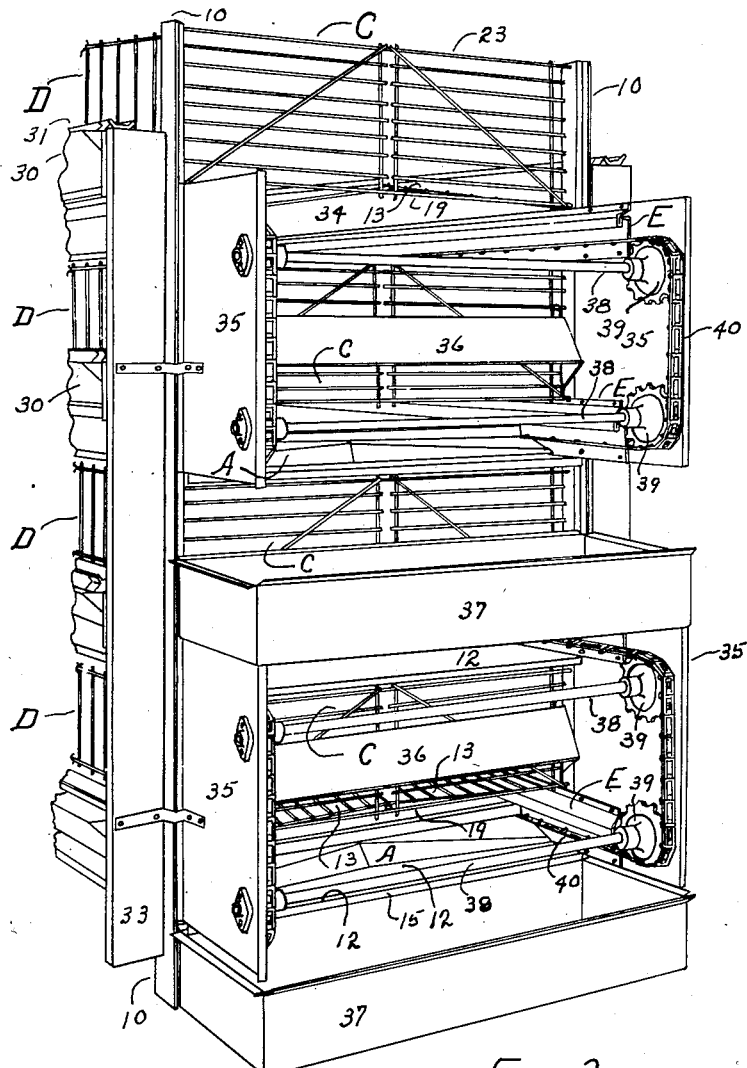
Fig. 2 is a three quarter perspective view of the opposite end of the device shown in Figure 1.
Figure 3:
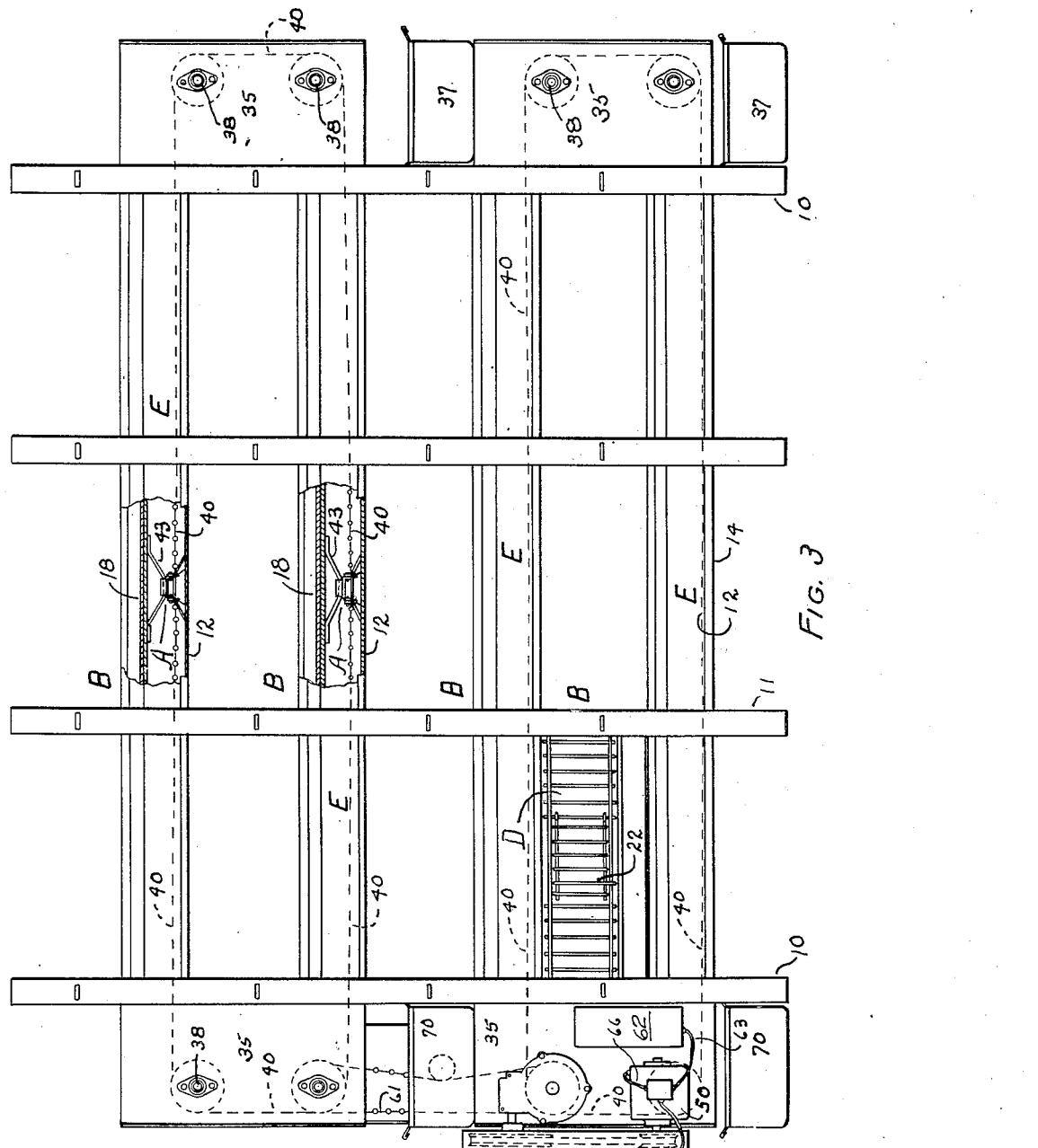
Fig. 3 is a side elevational view of the device shown in Figures 1 and 2 taken from the motor side of the device with the feeding and watering troughs removed and having a broken away section in order to illustrate in full lines two of the scrapers in a medial position and showing one wire closure for the sides of the compartments.

The frame of my device comprises corner posts 10, intermediate post 11 arranged on opposite sides of the device as illustrated in Figure 3, longitudinal bars E and transverse members as will hereinafter appear. In Figures 1, 2 and 3 I illustrate a four compartment battery; that is, spaces for four separate groups of birds, one above the other. The means provided for forming the four compartments comprise four droppings pans 12 and four wire screen floors 13. The pans are provided with upwardly turned flanges 14 at their sides and downwardly extending flanges 15 at their ends.

Figure 4:
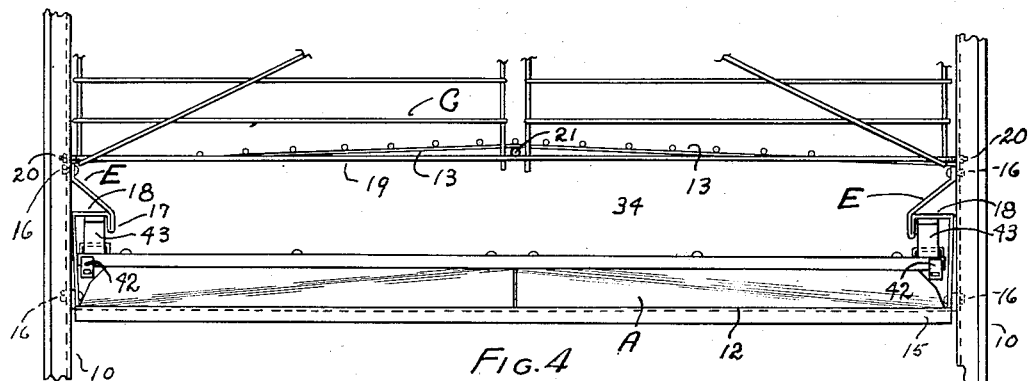
Fig. 4 is an enlarged drawing of a scraper as viewed from the end of the device and illustrating a fraction of the frame and a fraction of the wire closure for the ends of the compartments.

Posts 10 and 11 are secured together by means of side bars E having the shape clearly illustrated in Figure 4. These bars are suitably secured to posts 10 and 11 by means of bolts as at 16—16 (see Figure 4). Bars E are shaped so as to provide depending members 17 and a horizontal member 18 for a purpose which will hereinafter appear.

Posts 10 and 11 are also secured together by means of transverse members 19 which are about on the same plane as the top of bars E (see Figure 4) the ends extending through the longitudinal flanges of members 10 and 11 as at 20—20.

The centers longitudinally of members 13 are slightly higher than the outer edges and at this high point they rest on longitudinal bars 21 which in turn rest on members 19. The outer edges of members 13 are adjacent the top edges of members E. Clearly posts 10 and 11 may be of any cross section. In the present design I disclose these posts as being assembled into rectangular shapes (see Figure 5).

Droppings pans 12 are positioned a short distance below members 13 (see Figure 4). In order to provide inclosures for the birds above each wire screen floor, I provide rod assemblies C and D. The rods of these assemblies are close enough to confine the smallest birds placed in the compartments and are generally removably attached so the attendant can remove birds from the ends or sides of the device or a door 22 may be provided in members D for removing and replacing the birds (see Figure 3).

Member 13 is made of a suitable mesh so it answers as a floor for the birds, but the mesh is such as will permit droppings to fall into pans 12.

I provide any convenient means for feeding and watering the birds. In the figures, numeral 30 designates the feed troughs, which are arranged on opposite sides of each compartment and at the bottom. Directly above each of the feed troughs and slidably mounted thereon I provide preferably a V-shaped watering trough 31.

The mesh in members D is large enough so the birds have free access to the feeding and watering troughs as is customary in devices of the class. Members 31 are at one end, provided with an overflow which drains into a suitable vertical duct 33.

The design and manner of securing the feeding and watering troughs into position form no part of the present invention and I have shown these members merely as a matter of convenience.

It will be noted that members E form closures for the sides of the spaces between members 12 and 13. The ends of the spaces are left open as clearly illustrated in Figure 4. These openings are designated by numerals 34.

I provide side plate extensions 35—35 for each pair of compartments and on opposite ends of the device, I provide preferably deflector plates 36. The object of these deflectors is to direct the droppings that are scraped from the next above droppings pan outwardly so they will fall into droppings receptacles 37. These receptacles are removably secured and provided on opposite ends of the device, one for each pair of droppings pans.

Figure 6:
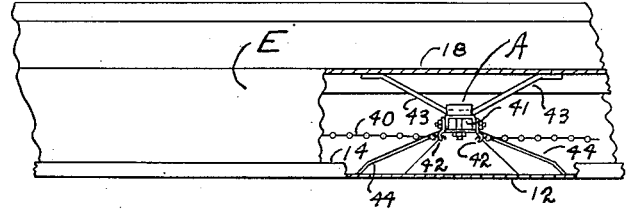
Fig. 6 is an enlarged end view of the scraper illustrated in Figures 3, 4 and 5 and showing a fraction of the guide bar and droppings pan.

I rotatably mount spaced shafts 38 in members 35, each shaft having two sprockets 39 in the position shown in Figure 1. I provide endless chains 40 which engage sprockets 39, two for each pair of inclosures, and position shafts 38 so that the upper and lower chain of the pairs of chains extend through spaces 34 at the sides thereof, the chains being secured to scrapers A as follows:

I provide an inverted channel 41 having depending plates 42—42 on opposite ends of the channels (see Figure 6). These plates are suitably secured to the ends of the chains (see Figure 6) so that when members A are in their medial positions, all of channels 41 will be in vertical alignment.

I secure two pronged brackets 43 to the ends of members 41, the prongs extending upwardly and outwardly in opposite directions from this member as illustrated in Figure 6, the outer ends being bent so they are parallel with each other and are arranged to yieldingly contact members 18 and thereby hold scraper blades 44 snugly against droppings pans 12.

Figure 5:
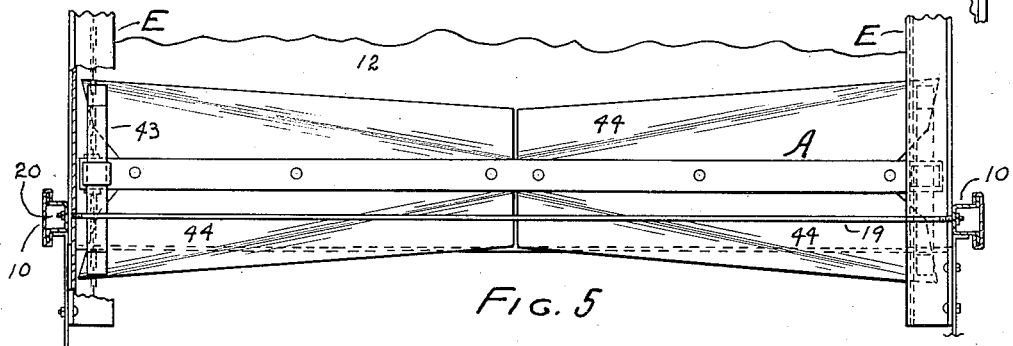
Fig. 5 is an enlarged top view of the scraper illustrated in Figure 4 showing a fraction of the frame structure, droppings pan, and guide bars.

Blades 44 are shaped and secured to members 41 as illustrated in Figures 4, 5 and 6 so that when they are moved across their droppings pans, all of the droppings will be scraped free and carried to the ends of the pans and deposited in members 37.

I provide means whereby the pairs of scrapers are moved simultaneously in opposite directions to the ends of their pans and then rest in this position for a predetermined length of time, after which they are moved in opposite directions to the other ends of their pans.

I preferably provide means for automatically moving the scrapers across the tops of their pans and at predetermined intervals as follows:

A motor 50 is mounted on a member 35 preferably as illustrated in Figures 1 and 3, having preferably a plug-in extension 51, a V-belt pulley 52, an operating connection to a shaft 38 by means of a worm gear 53, and a worm pinion 54 which is mounted on a shaft 55. Shaft 55 is rotatably mounted in bearings 56—56 and has at its outer end a V-belt pulley 57.

An operating connection between pulleys 52 and 57 is formed by means of a V-belt 58 thus when motor 50 turns in one direction or the other, shaft 38 will be turned in one direction or the other.

On the opposite end of shaft 38 from worm gear 53 I mount a sprocket 59 (see Figure 1). On the lower shaft 38 of the upper pairs of shafts, I mount a sprocket 60. Sprockets 59 and 60 are operatively connected together by means of a chain 61; thus the upper pair of shafts will be turned similar to the lower pairs in a manner which will move adjacent pairs of scrapers simultaneously in opposite directions because of chains 40.

Motor reversing and stopping and starting switches are provided and designated in their entireties by reference characters F and G respectively. Members F and G are preferably mounted in a switch box 62 (see Figure 3). Box 62 is provided with a conduit 63 which leads to a motor terminal box which in its entirety is designated by reference character H.

Extension 51 comprises line wires 64 and 65. Certain terminals in box H are connected to motor 50 by means of suitable wires in conduit 66. Wires 68, 69, 70, and 71 extend from terminals in box H through conduit 63 to the various terminals in box 62. Wires 70 and 71 lead to terminals in member H which are connected to the main motor coil 45. Wires 68 and 69 are connected to terminals in member H which are in turn connected to the motor starting coil 46 when the switch 47 is closed, this switch is opened by centrifugal force when the motor is above a predetermined speed.

Switch F is operated as follows:

I mount stops 73 and 73a and position these stops so they are in vertical alignment with each other when in the center of the device. When the lower half of the chain travels in the direction indicated by arrow in Figure 10, and when its scraper is near or at the left end of its droppings pan, stop 73 will contact member 74 which is slidably mounted in member 75, the other end being bent outwardly and extending through a slot 76 in member 35 and being longitudinally slidably secured (not shown) to the bottom end of a lever 77 as at 78.

Stop 73 is in a position which will move the lower end of lever 77 on its pivot 80 in the direction indicated by the arrow when the scrapers are at one end of their droppings pans. I provide a second lever 79 on member 35 which is separately pivoted with lever 77 to member 35 as at 80. The upper end of lever 79 is provided with a connection to another member 81 and is slidably mounted on member 35 as at 75a. The left end of upper member 74 extends through another slot 76a and is operatively connected to the upper end of lever 79 as at 82. Slots 76 and 76a are made wide enough so that the angled ends of members 74 and 81 will be free to move in an arc about pivot 80.

It will be seen that when the scrapers are at opposite ends of their pairs of droppings pans with the lower scraper at the left end of its pan, member 77 will be in the position shown in Figure 7, and when, as will hereinafter appear, the motor is reversed, and the chain caused to travel in the other direction, and when the upper scrapers are at the other ends of their pans, the upper end of member 79 will be moved to the left.

On the opposite ends of members 77 and 79, I secure chains 83—83, each extending around a pulley 84 and engaging spring 85, the inner ends of the spring being operatively connected to lever 86 as at 87—87.

Figure 9:
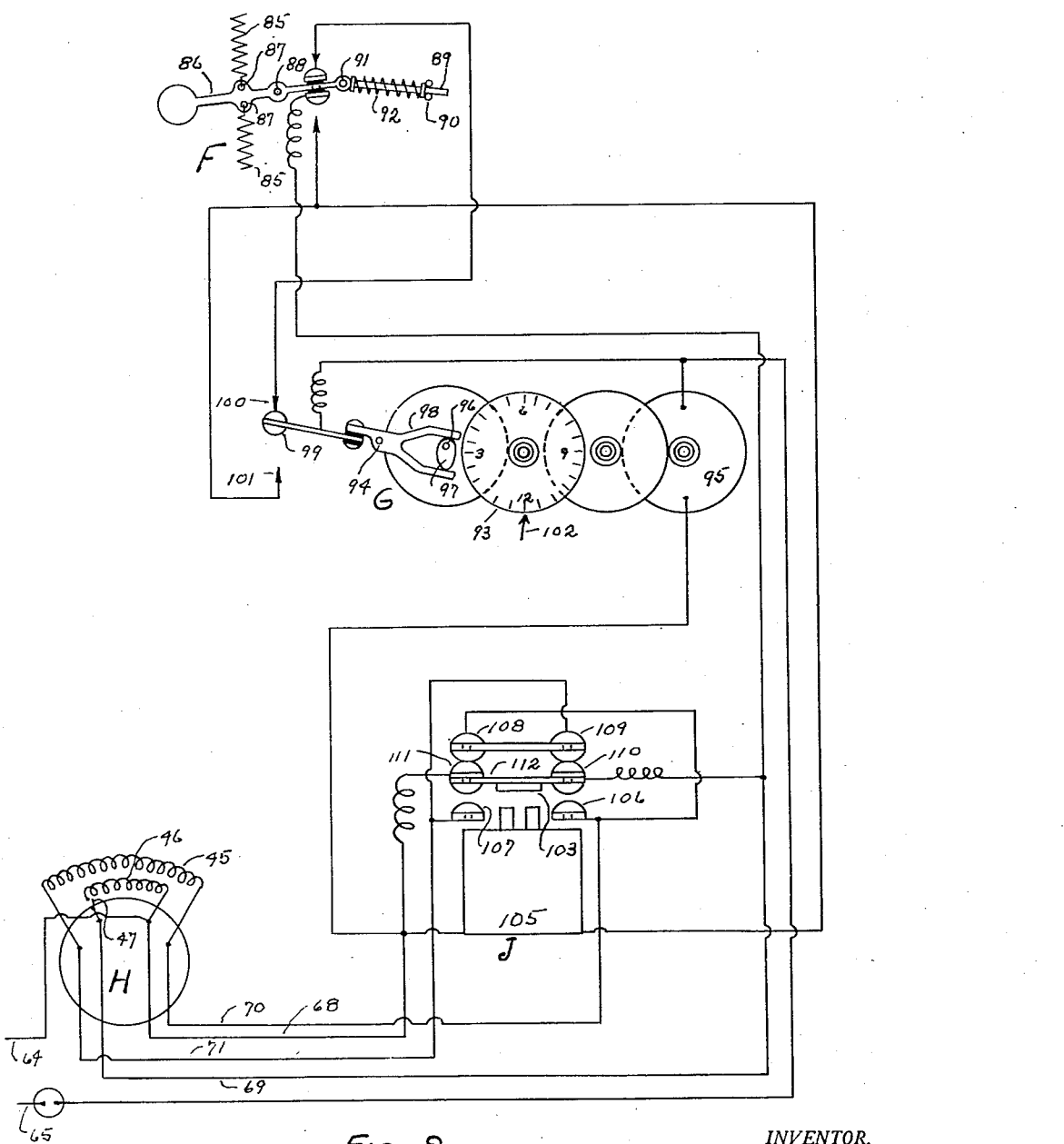
Fig. 9 is a diagrammatic drawing illustrating the switches, relay, electric circuits and clock mechanism for operating the stopping and starting switches.

Lever 86 is hinged as at 88. I provide means whereby lever 86 is yieldingly forced into its two extreme positions in any convenient manner. In Figure 9 I have shown one form of a toggle joint for this purpose which comprises a rod 89 which is slidably mounted in a bracket 90, one end being hingedly connected to lever 86 as at 91 and having a spring 92.

It will be seen that stops 73—73a will act to throw the switch in one direction when the scrapers are at one end of their droppings pans and throw this switch in the opposite direction when the scrapers are at the opposite ends of their droppings pans. The object of this switch is to reverse and stop the motor because of the position of the switch on member G.

I provide means associated with a clock operated switch which, after a predetermined time, will act to again close the circuit and cause the motor to move the scrapers to the other ends of their droppings pans as follows:

Clock 95 is operatively connected to a shaft 96 by means of a chain of gears and pinions so shaft 96 will preferably turn one half way around every three hours. A cam 97 is secured to shaft 96. A forked bracket 98 is adapted to be moved in opposite directions by cam 97 so as to bring switch member 99 in contact with switch point 100 when in one position and cause member 99 to contact point 101 when cam 97 is in the other position. Member 98 is hingedly mounted as at 94.

Clearly the switch in member G can be made to operate every three hours or the gears between shaft 96 and the clock may be arranged so the cam will act on the switch every four or six hours.

By scrutinizing Figures 1, 7, 8, 9, and 10, and the position of switches F, G and J, it will be seen that the motor will be operating to move the scrapers in opposite directions, that when the scrapers reach the ends of the pans switch F will be operated, stopping the motor and forming connections which will reverse the motor which is now standing, then when the clock acts to contact members 99 and 101, the motor will again be started in the opposite direction. The position of switch G will hold the circuit open because of the position of switch F. When clock 95 acts to bring points 99 and 101 together as next above recited, the circuit will be closed. Thus when the clock causes member 99 to alternately contact members 100 and 101, the scrapers will be moved alternately across their pans. In other words, when the motor is reversed it is stopped because of the position of switch G which is controlled by the clock.

Member G is shown in its simplest form. I prefer however, a snap switch mechanism having a disc 93 marked similar to the numbers on the face of a clock and provide adjustable means so member 93 may act to operate the switch when a predetermined number on the disc is in line with an arrow 102. As shown in Figure 9, the device is positioned to operate at 12 o'clock and start the motor by reversing the switch and then when the motor is stopped by switch F, the clock mechanism will act to again reverse the switch in member G at say 9 o'clock. Disc 93 is provided with means whereby it may be positioned so the switch will be operated at any predetermined time by moving the disc so the arrow indicates the time for operating the switch.

As is the custom in devices of the kind, I provide a relay which is operated by switch F. This relay is designated in its entirely by reference character J and comprises a coil 105, and contact points 106, 107, 108 and 109. Contact points 110 and 111 are mounted on an insulating bar 112 which is adapted to be moved to the position shown by a spring (not shown) and when coil 105 in energized, member 112 will be moved downwardly because of iron bar 103 so members 110 and 111 will be brought in contact with members 106 and 107; thus to reverse the motor but the circuit will have been opened by switch G so the motor will not start in the other direction until member 99 is brought in contact with member 101 by the operation of the clock since members 110 and 111 oscillate somewhat, wires 68 and 69 are coiled adjacent these parts as shown, so as to permit free movement of member 112.

It will be seen that switches F and G and relay J will act to reverse and stop the motor when the scrapers are at one end of a pan and the clock will act to start the motor and move the scrapers to the other end of the pan at which time switch F will again operate to reverse and stop the motor until switch G is moved to the other position, switch F acting to operate the relay and the relay acting to reverse the connections to the motor by throwing the motor into the circuit which is open because of the position of switch G.

Having thus shown and described my invention, I claim:

1. A device of the character described, comprising an elongated frame rectangular in horizontal and vertical section, a droppings pan at the bottom of said frame and a droppings pan intermediate the bottom and top thereof, a screen floor positioned a short distance above each of said pans, closures positioned between the bottom screen and the upper droppings pan and between the upper screen and the top of the device forming compartments, one above the other, guideways positioned between the sides of each of said pans and the adjacent sides of the screen floors, an endless chain on each side of the device, the top and bottom portions of each chain extending along and adjacent the insides of the adjacent guideways, each of said chains extending around sprockets which are positioned at the ends of the frame, and a double edged scraper adapted to lie transversely on each of said droppings pans, their ends being secured to the adjacent portions of the chains, said chains being operatively connected together whereby the scrapers are in vertical alignment when in the longitudinal center of the pans, said guideways having inwardly extending tracks which lie a distance above the adjacent portions of the chains, said scrapers having at each end means adapted to yieldingly contact the under sides of said tracks and thereby yieldingly hold the scrapers downwardly against the droppings pans, whereby the scrapers may be moved in opposite directions simultaneously from one end of the pans to the other.

2. A device of the character described, comprising an elongated frame rectangular in horizontal and vertical section, a number of vertically spaced droppings pans in said frame, a screen floor positioned a short distance above each of said droppings pans, closures between each said screen floor and the next above droppings pan and between the upper screen floor and the top of the frame forming separate compartments, guideways positioned between the sides of each of said pans and the adjacent sides of the screen floors, pairs of endless chains, the chains of each pair being positioned on opposite sides of the inclosure, the top and bottom of each chain extending along and adjacent the insides of said guideways, each chain extending around sprockets at the ends of the device, and a double edged scraper adapted to lie transversely on each of said droppings pans, their ends being secured to the adjacent portion of the chains, each pair of chains being operatively connected together, whereby the scrapers of each pair of chains are in vertical alignment when in the longitudinal centers of their pans, said guideways having inwardly extending tracks which lie above the adjacent chains, said scrapers having at each end means adapted to yieldingly contact the under side of the tracks to thereby yieldingly hold the scrapers downwardly against their droppings pans, whereby the scrapers of each pair of chains may be moved in opposite directions simultaneously from one end of their pair of pans to the other.

3. A device as recited in claim 1 including; a reversible motor having a reversing and stopping mechanism operatively connected to said chains, stops attached to one of the chains adapted to alternately operate said reversing mechanism when the scrapers are at the ends of the pans, and a clock mechanism associated with said stopping mechanism adapted to again close the circuit and cause the motor to operate in the other direction after a predetermined time whereby the scrapers will be caused to move across their pans at intervals as determined by the clock.

4. A device as recited in claim 2 including; a reversible motor having a reversing and a stopping mechanism and being operatively connected to each of said pairs of chains, stops on one of the chains adapted to operate said reversing and stopping mechanism alternately when the scrapers are at the ends of the pans, and a clock mechanism associated with said reversing and stopping mechanism adapted to close the circuit again after a predetermined lapse of time whereby the scrapers will be caused to move across their pans at intervals as determined by the clock.

HARRY O. PETRASKE.

REFERENCES CITED

The following references are of record in the file of this patent:

UNITED STATES PATENTS

| Number | Name | Date |
|---|---|---|
| 1,878,503 | Martin | Sept. 20, 1932 |
| 1,879,818 | Nielsen | Sept. 27, 1932 |
| 2,068,566 | Olson et al. | Jan. 19, 1937 |
| 2,096,356 | Fox | Oct. 19, 1937 |
| 2,281,339 | Taggart | Apr. 28, 1942 |
| 2,294,025 | Dagg | Aug. 25, 1942 |
| 2,307,984 | Brand | Jan. 12, 1943 |

FOREIGN PATENTS

| Number | Country | Date |
|---|---|---|
| 446,019 | Great Britain | Apr. 28, 1936 |